United States Patent [19]

Reiterman et al.

[11] Patent Number: 5,320,458
[45] Date of Patent: Jun. 14, 1994

[54] CUTTING TOOL HAVING A CUTTER CARTRIDGE ADJUSTABLE AROUND TWO ADJUSTMENT AXES

[75] Inventors: Lee Reiterman, Royal Oak; Kenneth G. Noggle, West Bloomfield, both of Mich.

[73] Assignee: Valenite Inc., Madison Hts., Mich.

[21] Appl. No.: 90,672

[22] Filed: May 24, 1993

[51] Int. Cl.⁵ ............................................. B23B 27/00
[52] U.S. Cl. ...................................... 408/180; 407/44; 407/81; 407/89; 408/153
[58] Field of Search ............... 408/147, 153, 154, 156, 408/173, 180, 181, 185, 187, 197; 407/37, 44, 45, 46, 76, 81, 83, 89

[56] References Cited

U.S. PATENT DOCUMENTS 2,458,753  1/1949  Wallace .............................. 408/180
4,292,865 10/1981  Liu et al. .
4,631,994 12/1986  Jester et al. .
4,927,301  5/1990  Reiterman .
5,147,157  9/1992  Pawlik ................................. 407/89
5,154,551 10/1992  Noggle .
5,156,501 10/1992  Pawlik et al. ...................... 407/89

Primary Examiner—Daniel W. Howell
Attorney, Agent, or Firm—Bill C. Panagos

[57] ABSTRACT

A cutting tool includes a rotary bar having an arcuate pocket in its side surface, and a segmental carrier arcuately slidable in the pocket to adjust the position of a cutting tip on a cutter blade. The carrier has a second arcuate pocket that slidably receives a segment-shaped shoe, such that the shoe can be arcuately adjusted to control or vary the back taper angle on the blade. The cutting blade is mounted flatwise on one face of the shoe, such that a corner tip on the blade projects beyond the profile of the rotary bar for use in reaming a hole in a workpiece. The adjustment axis of the shoe is coincident with the cutting tip on the reamer blade so that adjusting motions of the shoe do not disturb the position of the cutting tip achieved by arcuate adjustment of the carrier.

12 Claims, 2 Drawing Sheets

CUTTING TOOL HAVING A CUTTER CARTRIDGE ADJUSTABLE AROUND TWO ADJUSTMENT AXES

BACKGROUND OF THE INVENTION

1. Field of the Invention

This invention relates to a rotary cutting tool, and particularly to a tool that can perform machining operations, such as boring, milling, reaming and analogous machining operations.

2. Prior Developments

U.S. Pat. No. 4,927,301, granted to Lee Reiterman on May 22, 1990 discloses a boring bar having a cutter cartridge mounted in a side surface of the bar, and an adjustment means for adjusting the tip of the cutting tool relative to the bar rotational axis so as to compensate for part size, tool wear or manufacturing tolerances. The adjusting mechanism comprises a pocket in the bar side surface, and a shoe (or anvil) arcuately slidable in the pocket; the pocket and shoe have mating arcuate surfaces. By arcuately sliding the shoe along the pocket arcuate surface it is possible to adjust the location of the shoe and the associated cutting tip relative to the rotational axis of the boring bar.

In reaming tools it is desirable or advantageous to not only adjust the location of the cutting tip, but alos to adjust the back taper of the cutter insert so as to ensure that the cutting action will take place at the tip of the cutter insert (blade) rather than along a side edge of the blade.

IN THE UNITED STATES PATENT AND TRADEMARK OFFICE

The present invention relates to a rotary cutting tool comprising a cutter insert, and means for achieving two types of adjustment of the insert. A first adjustment involves an adjustment of the cutter tip toward or away from the tool rotational axis, thereby controlling the diameter of the hole produced by the cutting tool. A second adjustment involves an adjustment of the cutting blade around an axis passing through the cutter tip, thereby controlling or adjusting the back taper of the cutting blade. Each separate adjustment is achieved by means of an arcuate segmental shoe seatable in an arcuate pocket. By rotating the shoe within the pocket it is possible to achieve an adjusting action of the shoe.

In a preferred form of the invention the cutting tool comprises a rotary bar having an arcuate pocket in tis side surface. A segment-shaped carrier is seated in the pocket for arcuate adjustment around the axis of the pocket arcuate surface. The carrier has a second arcuate pocket therein that slidably seats a segment-shaped cutter cartridge. The arcuate surface of the second pocket is centered on a second adjustment axis that passes through the tip of the cutter.

By adjusting the position of the carrier in the first arcuate pocket it is possible to adjust the position of the cutter tip relative to the bar rotational axis. By arcuately adjusting the cartridge in the second pocket it is possible to adjust the back taper of the cutter insert. Since the second adjustment axis passes through the tip of the cutter insert the back taper adjustment does not disturb the position of the cutting tip; the cutting tip remains motionless during the back taper adjustment process.

THE DRAWING

DESCRIPTION OF A PREFERRED EMBODIMENT OF THE INVENTION

The drawings fragmentarily illustrate a rotary cutting tool specifically designed to perform a hole finishing operation. The tool comprises an elongated cylindrical bar 11 having a localized flat surface 13 at a point along its side surface. The cylindrical bar has a longitudinal rotational axis 15.

Figure 1:
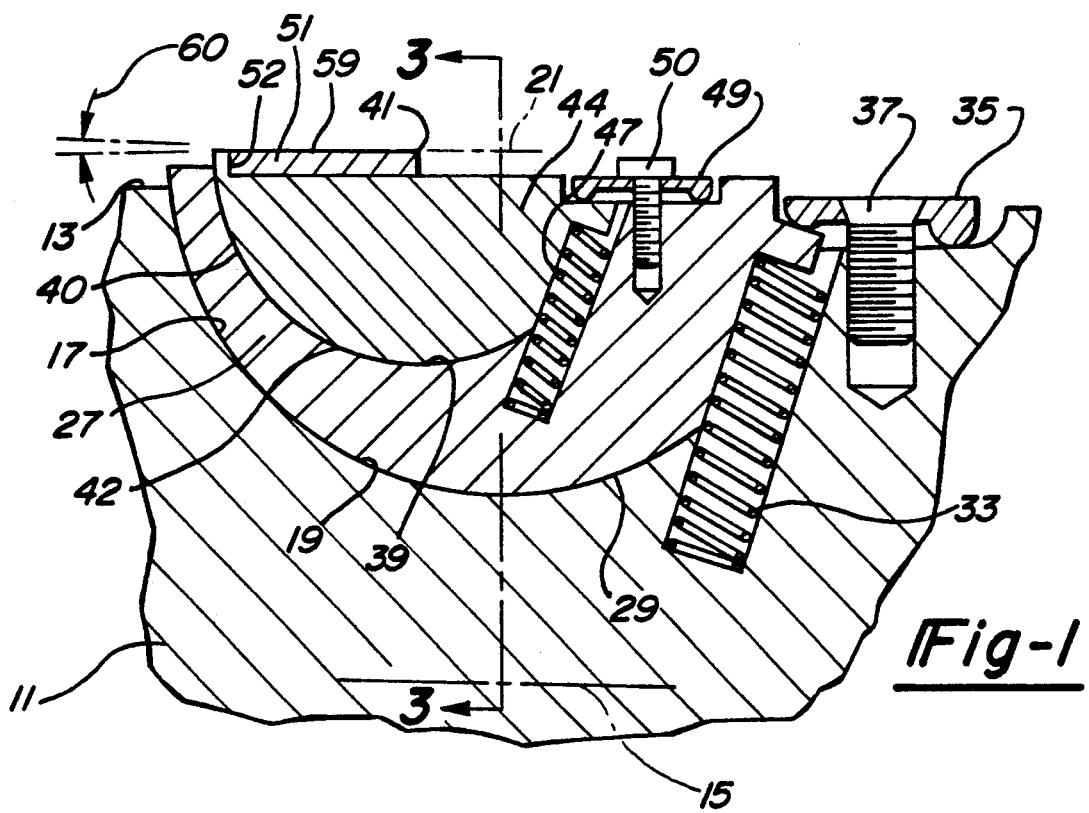
FIG. 1 is a fragmentary sectional view taken through a rotary cutting tool embodying the present invention.

As shown in FIG. 1, a pocket 17 is formed in flat surface 13, said pocket comprising an arcuate concave bottom surface 19 centered on an axis 21 extending transverse to the bar rotational axis 15. Pocket 17 further comprises flat side surfaces 23 and 25 extending normal to axis 21, i.e. parallel to axis 15.

Seated in pocket 17 is a segment-shaped carrier 27, said carrier having a convex arcuate surface 29 slidably engaged with concave surface 19. An arcuate flange 30 extends from a side surface of carrier 27 into an arcuate groove 31 formed in side surface 23 of the pocket, such that the carrier can slide arcuately around axis 21 but cannot otherwise escape from pocket 17. Groove 31 and flange 30 are centered on axis 21 to provide the desired arcuate guidance of carrier 27. It will be appreciated that other escape-prevention means can be used.

Carrier 27 is locked in selected positions of adjustment by means of a coil spring 33 and a lever 35. The coil spring extends through the arcuate bottom surface 19 into engagement with a shoulder formed on carrier 27 so as to bias the carrier in a counterclockwise direction around adjustment axis 21. Lever 35 has its opposite ends engaged with the bar and the carrier; a screw 37 extends through the lever into the bar material to hold the lever in position against the biasing force of spring 33. By screwing screw 37 into the bar the lever exerts a force on the carrier overcoming the spring force and adjusting carrier 27 in a clockwise direction around adjustment axis 21. By unscrewing screw 37 the left end of the lever is raised so as to allow spring 33 to adjust the carrier in a counter-clockwise direction around axis 21.

Carrier 27 has a second arcuate pocket 40 therein that includes an arcuate concave bottom surface 39 centered on a second adjustment axis 41 located to the left of adjustment axis 21. The two adjustment axis are parallel to each other and transverse to the bar rotational axis 15.

A cartridge 46 is slidably seated in arcuate pocket 40 for adjustment around axis 41. Cartridge 46 comprises a segment-shaped shoe 44 having a convex arcuate surface 41 seated on concave arcuate surface 39, whereby the shoe is slidable around axis 41. An arcuate flange 43 extends from a side surface of the shoe into an arcuate groove 45 in a side surface of pocket 40 to prevent escape of the shoe from pocket 40.

Cartridge 43 is locked in selected positions of adjustment by means of a coil spring 47 and a lever 49. The coil spring extends through arcuate pocket surface 39 into engagement with a shoulder formed on shoe 44 so as to bias the shoe in a counter-clockwise direction around adjustment axis 41. Lever 49 has its opposite ends engaged with carrier 27 and shoe 44; a screw 50 extends through the lever into a threaded opening in the carrier.

The relationship between screw 50 and lever 49 is similar to the relationship that exists between screw 37 and lever 35. By screwing screw 50 into the carrier, shoe 44 is adjusted in a clockwise direction around adjustment axis 41. By unscrewing screw 50 and coil spring 47 is enabled to move the shoe in a counter-clockwise direction around adjustment axis 41.

Figure 2:
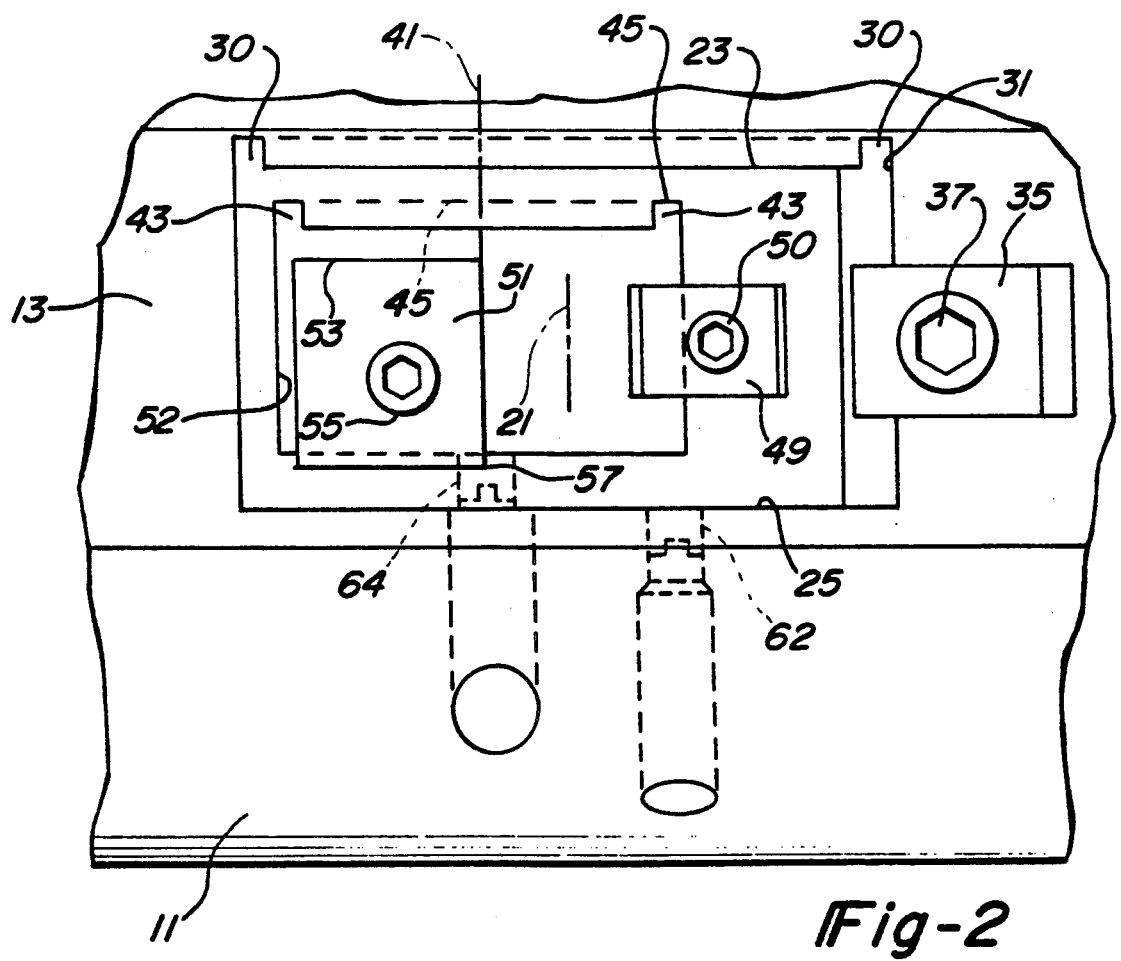
FIG. 2 is a plan view of the structure depicted in FIG. 1.

Shoe 44 severs as a mounting device for cutter blade 51. As shown in FIG. 2, the cutter blade can have a rectangular plan configuration, wherein two edges of the blade abut shoulders 52 and 53 formed on shoe 44. The cutter blade 51 is held on the shoe by means of a screw 55.

Figure 3:
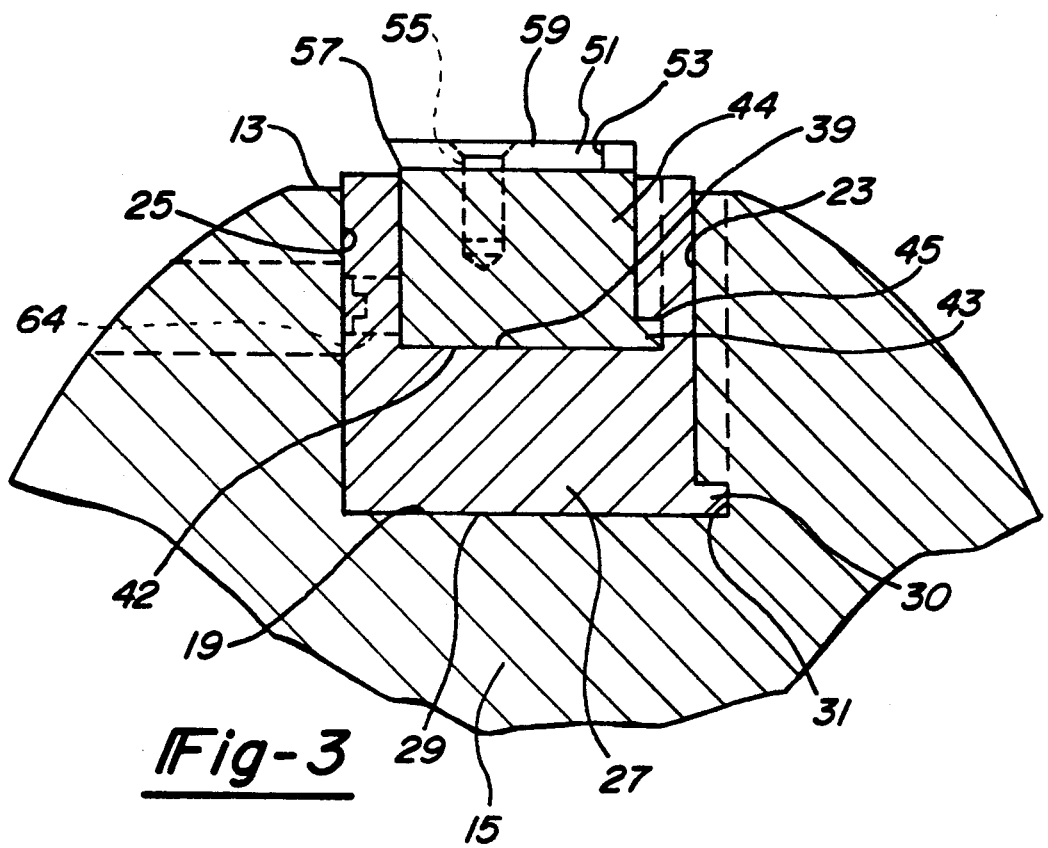
FIG. 3 is a fragmentary sectional view taken on line 3—3 in FIG. 1.

The cutting action is achieved by a sharpened tip 57 formed on one corner of blade 51. As can be seen from FIG. 3, tip 57 projects beyond the cylindrical surface profile of bar 11 so as to be operative for a hole reaming operation.

The cutter blade 51 is subject to two different adjustments, i.e. a first rotary adjustment of carrier 27 around axis 21, and a second rotary adjustment of shoe 44 around axis 41. Adjustment of carrier 27 around axis 21 raises or lowers blade 51, thereby adjusting the position of cutting tip 57 relative to the bar rotational axis 15. Adjustment of carrier 27 therefore adjusts the diameter of the finished hole.

The second adjustment of shoe 44 around axis 41 adjusts the back taper of the blade face 59, but without disturbing the position of cutting tip 59. As shown in FIG. 1, face 59 has a back taper angle 60 measured from adjustment axis 41 (which is coincident with tip 57).

An important feature of the invention is that cutting tip 57 is located on adjustment axis 41. This relationship ensures that when shoe 44 is adjusted around axis 41 (to vary the back taper angle), cutting tip 57 will remain essentially motionless, since it is located on the adjustment axis. The two adjustments are independent of one another, such that the second adjustment (of shoe 44) does not adversely affect the position of cutting tip 57 achieved by the first adjustment (of carrier 27).

Carrier 27 and shoe 44 ca be locked against undesired side play (parallel to axis 21 and 41) by means of set screws 62 and 64. Set screw 62 is threaded into an opening in bar 11 for abutment with a side surface of carrier 27. Set screw 64 is threaded into an opening in carrier 27 for abutment with a side surface of shoe 44. Screws 62 and 64 are tightened after carrier 27 and shoe 44 have been moved to their final positions of adjustment. During the adjusting operations screws 62 and 64 are in loosened conditions.

The invention is most particularly concerned with the multiple adjustments of carrier 27 and shoe 44, whereby the position of cutting tip 57 and the back taper angle 60 can be independently controlled. A major feature of the invention is the location of the cutting tip 57 on the adjustment axis 41; whereby the back taper angle adjustment does not disturb the position of the cutting tip.

Figure 4:
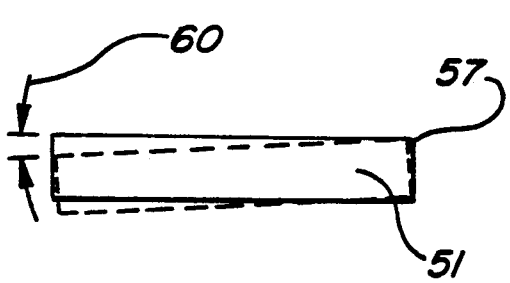
FIGS. 4 and 5 are diagrammatic representations of back taper adjustments performed on two different cutter blade configurations, using the adjustment structures illustrated in FIGS. 1 through 3.
Figure 5:
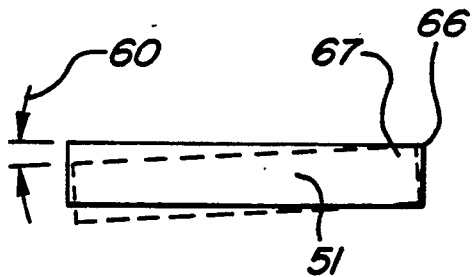

FIGS. 4 and 5 show different cutting tip configurations that can be employed in reamer type cutters. In FIG. 4 the cutting tip is a sharpened corner on the reamer blade 51. With such a construction the adjustment axis would be exactly coincident with sharpened tip 57. FIG. 5 shows the cutting tip as a rounded radius 66 centered on a center of curvature 67. With the FIG. 5 cutting tip configuration the adjustment axis is located so as to be coincident with the center of curvature 67; during a back taper angle adjustment operation center 67 remains motionless so that rounded radius 66 is essentially undisturbed by the taper angle adjustment process.

The drawing show particular constructions and configurations used in one form of the invention. However, it will be appreciated that the invention can be practiced in various forms.

What is claimed is:

1. A cutting tool comprising a bar having a rotational axis, and a side surface parallel to said axis; a pocket in said side surface having a first arcuate concave bottom surface centered on a first adjustment axis transverse to said rotational axis; a carrier having an arcuate convex bottom surface seated on said concave surface for adjustment around said first adjustment axis; said carrier having a second pocket that includes a second arcuate concave bottom surface centered on a second adjustment axis transverse to said rotational axis; and a cutter cartridge having an arcuate bottom surface seated on said second concave surface for adjustment around said second adjustment axis; said cartridge having a cutting tip located on said second adjustment axis, whereby said cutting tip remains essentially motionless during adjustment of the cartridge around said second adjustment axis.

2. The cutting tool of claim 1, wherein said cartridge comprises a shoe seated in said second pocket, and a cutter blade removably mounted on said shoe.

3. The cutting tool of claim 2, wherein said cutter blade is a reamer blade.

4. The cutting tool of claim 1, wherein said first adjustment axis and said second adjustment axis are parallel to each other and located outside the bar side surface.

5. The cutting tool of claim 1, and further comprising means for locking said carrier in selected positions of adjustment; said locking means comprising spring means biasing the carrier in one direction around the first adjustment axis, and a lever means biasing the carrier in an opposite direction around the first adjustment axis.

6. The cutting tool of claim 5, wherein said spring means is a coil spring extending through said first concave surface into said first pocket.

7. The cutting tool of claim 6, wherein said lever means comprises a lever element having one end seated on the bar and one end seated on the carrier, and an adjustment screw extending through the lever element into the bar.

8. The cutting tool of claim 1, and further comprising means for locking said cartridge in selected positions of adjustment; said locking means comprising spring means biasing the cartridge in one direction around the second adjustment axis, and a lever means biasing the cartridge in an opposite direction around the second adjustment axis.

9. The cutting tool of claim 8, wherein said spring means is a coil spring extending through said second surface into said second pocket.

10. The cutting tool of claim 9, wherein said lever means comprises a lever element having one end seated on the carrier and one end seated on the cartridge, and an adjustment screw extending through the lever element into the carrier.

11. The cutting tool of claim 1, wherein said first pocket comprises a side surface normal to said first adjustment axis, and an arcuate groove in said pocket side surface centered on said first adjustment axis; said carrier having a side surface abutting said pocket side surface, and an arcuate flange extending from said carrier side surface into said arcuate groove.

12. The cutting tool of claim 1, wherein said second pocket comprises a side surface normal to said second adjustment axis, and an arcuate groove in said pocket side surface centered on said second adjustment axis; said cartridge having a side surface abutting said pocket side surface, and an arcuate flange extending from said cartridge side surface into said arcuate groove.

* * * * *